(No Model.)
T. W. BROWN.
COTTON CULTIVATOR.
No. 468,300. Patented Feb. 2, 1892.
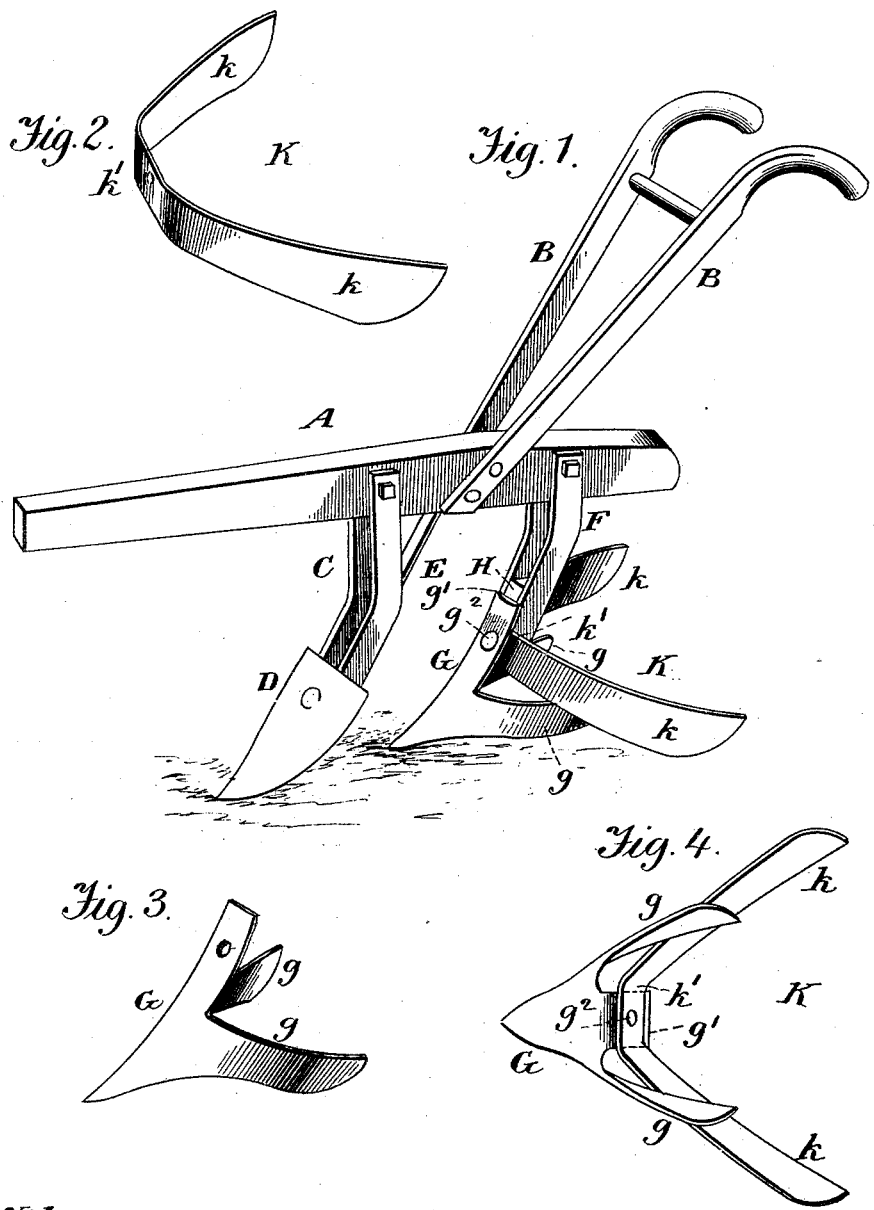
Witnesses.
A. Ruppert
H. A. Daniels
Inventor.
Thomas W. Brown,
Per
Thomas P. Simpson,
Atty

UNITED STATES PATENT OFFICE.

THOMAS WILSON BROWN, OF SARDINIA, SOUTH CAROLINA.

COTTON-CULTIVATOR.

SPECIFICATION forming part of Letters Patent No. 468,300, dated February 2, 1892.

Application filed December 11, 1890. Serial No. 374,286. (No model.)

*To all whom it may concern:*

Be it known that I, THOMAS WILSON BROWN, a citizen of the United States, residing at Sardinia, in the county of Clarendon and State of South Carolina, have invented certain new and useful Improvements in Cotton-Cultivators; and I do hereby declare the following to be a full, clear, and exact description of the invention, such as will enable others skilled in the art to which it appertains to make and use the same.

The special object of the invention is to make a skeleton consisting of two wings connected by a median piece, the whole adapted to be fitted on any sweep-plow for the purpose of following a shovel-plow, which loosens up the ground and thus fills up the furrow or levels the ground, the object being to allow the air to permeate the ground as well as to keep it moist; also, to permit water to quickly be absorbed, whether it be rain or atmospheric moisture.

Figure 1 of the drawings is a perspective view of a cotton-cultivator with my auxiliary sweep attached thereto; Fig. 2, a detail view of my auxiliary sweep; Fig. 3, a detail view of the sweep, and Fig. 4 a bottom view of the sweep with my auxiliary attachment.

In the drawings, A represents a plow-beam provided with the handles B B.

C is the holder of the shovel-plow D, and is reinforced by the rear brace E, attached to the under side of the beam.

F is the holder of the sweep-plow G, which is bolted at $g^2$ to the block H, which is itself made fast in the holder F. These devices are all old and well known to the public, and are employed to cultivate the ground between the rows of cotton; but they require the team to run three times in one row, while by my auxiliary sweep the mule or horse does the same work and does it better by passing once in a row, thus saving two-thirds the expense of cultivation.

K represents my auxiliary sweep, which may be made from thirty to forty-six inches wide, according to the distance between the rows of cotton-plants, may be attached to any ordinary sweep, and may be used with any suitable stock. The auxiliary sweep K consists of two opposite and corresponding wings $k$ $k$, placed at an obtuse angle to the intermediate connecting-piece $k'$, the whole being preferably made integral or of one piece of metal. The part $k'$ is passed under the median upward projection $g'$ of the sweep G and the wings $k$ $k$ over the wings $g$ $g$ of the sweep, said part $k'$ being held by the bolt $g^2$ to the projection $g'$ and to the block H. The shovel-plow D runs to a considerable depth in the middle of the row and is followed by the sweeps, which run very shallow and level down the pulverized soil which has been thrown up on each side of the center. The plow with the ordinary sweep runs too deep to go very near the plants, as it would injure the roots of the growing plant; but by placing my auxiliary sweep higher up on the standard and making its wings much longer than the ordinary one I break the crust of the soil close up to the plants, thereby admitting air and moisture to the roots and killing the tender young weeds which have just begun to shoot. The bull-tongue in front of the ordinary sweep breaks the ground deeply in the middle of the row, while its sweep comes after and fills the furrow made, the auxiliary sweep at the same time stirring the surface of the soil up nearly to the plants. Thus I work the whole space between two rows of plants at one operation.

Having thus described all that is necessary to a full understanding of my invention, what I claim as new, and desire to protect by Letters Patent, is—

The combination, with the plow G, having wings $g$ $g$, the block H, and the standard F, of the sweep K, bolted to the block between the plow and standard and provided with the wings $k$ $k$, the latter arranged above and extending laterally beyond the wings $g$ $g$, whereby the wings $g$ $g$ will stir the soil deeply in the middle of the row, while the wings $k$ $k$ will only stir the surface of the soil adjacent to the plants, as and for the purpose set forth.

In testimony whereof I affix my signature in presence of two witnesses.

THOS. WILSON BROWN.

Witnesses:
J. D. HICKS,
R. B. GARLAND.